United States Patent
Baraban et al.

[11] Patent Number: 6,112,148
[45] Date of Patent: Aug. 29, 2000

[54] SYSTEM AND METHOD FOR CONTROLLING DIAGNOSTIC ANNUNCIATORS

[75] Inventors: Dmitri V. Baraban, Fairfield, Ohio;
David L. Clark, Columbus, Ind.;
William A. Rankin, Columbus, Ind.;
Randal L. Bergstedt, Columbus, Ind.;
Danny R. Baker, Columbus, Ind.;
Kenneth S. Houston, Seymour, Ind.

[73] Assignee: Cummins Engine Co., Inc., Columbus, Ind.

[21] Appl. No.: 09/216,409

[22] Filed: Dec. 18, 1998

[51] Int. Cl.[7] .............................. G06F 11/30; G05B 9/02; F02D 11/10; F02D 41/22
[52] U.S. Cl. ............................ 701/107; 701/114
[58] Field of Search ................ 123/339.15, 396, 123/406.13, 690, 479, 568.16; 701/31, 34, 39, 43, 62, 63, 76, 92, 97, 107, 114

[56] References Cited

U.S. PATENT DOCUMENTS

| | | |
|---|---|---|
| 4,035,764 | 7/1977 | Fujinami et al. . |
| 4,497,057 | 1/1985 | Kato et al. . |
| 4,709,341 | 11/1987 | Matsuda . |
| 4,833,947 | 5/1989 | Izumi et al. . |
| 4,926,352 | 5/1990 | Staffe . |
| 5,047,944 | 9/1991 | Ishikawa et al. ................. 701/114 |
| 5,233,530 | 8/1993 | Shimada et al. ................. 701/107 |
| 5,250,761 | 10/1993 | Koyanagi . |
| 5,303,163 | 4/1994 | Ebaugh et al. . |
| 5,331,560 | 7/1994 | Tamura ........................... 701/114 |
| 5,365,436 | 11/1994 | Schaller et al. . |
| 5,365,438 | 11/1994 | Mitchell et al. . |
| 5,369,584 | 11/1994 | Kajiwara ......................... 701/114 |
| 5,506,773 | 4/1996 | Takaba et al. . |
| 5,531,122 | 7/1996 | Chatham et al. . |
| 5,579,227 | 11/1996 | Simmons, Jr. et al. . |
| 5,640,056 | 6/1997 | Setzer et al. . |
| 5,670,939 | 9/1997 | Rodewald et al. . |
| 5,964,811 | 10/1999 | Ishii et al. ....................... 701/114 |
| 5,966,305 | 10/1999 | Watari et al. ..................... 701/107 |

*Primary Examiner*—Willis R. Wolfe
*Attorney, Agent, or Firm*—Bakers & Daniels

[57] ABSTRACT

A diagnostic system for an engine is provided for which a plurality of annunciators are energized according to particular fault code sequences. A self-diagnosis mode is controlled by use of the vehicle throttle. The self-diagnosis mode can be initiated by a predetermined number of cycles of the vehicle throttle, in which a cycle corresponds to depressing and releasing the throttle beyond upper and lower limits. In one aspect of the invention, a timer is used to determine whether the predetermined number of throttle cycles occurs within a fixed time limit. If not, then the self-diagnosis mode is not activated. Once the self-diagnosis mode is activated, subsequent cycles of the vehicle throttle will increment the annunciators among the sequential fault codes.

20 Claims, 8 Drawing Sheets

SYSTEM AND METHOD FOR CONTROLLING DIAGNOSTIC ANNUNCIATORS

BACKGROUND OF THE INVENTION

The present invention relates to systems and methods for evaluation of the self-diagnostic functions of an electronic controller for a motor vehicle and its engine.

The use of built-in microcomputers to control various functions of a motor vehicle and its engine is very prevalent. The advent of the microcomputer in this arena has opened greater possibilities for the diagnosis of problems with either the vehicle or the engine operation. In one specific example, the microcomputer carries out a short self-diagnostic program prior to starting the engine. In one application, this self-diagnostic program monitors the various condition sensors and electrical actuators during the operation of the engine and vehicle. During engine operation, the self-diagnostic program stores information concerning intermittent or temporary events or faults. Long-term or severe faults can lead to immediate error indications, such as a visible or audible alarm.

Although the intermittent or temporary faults may not be significant enough to warrant vehicle shut down there is still some value in being aware of the occurrence of these events. In order to address this need, many self-diagnostic programs have means for initiating an annunciator flash-out of active faults. For example, if the annunciator is a panel of fault lamps, portions of the self-diagnostic routine will allow the service personnel to sequence through the fault lamps. As each lamp is sequentially illuminated, the stored error conditions can be manifested by a flashing warning signal. In another approach, the array of fault lamps can be illuminated to depict various diagnostic fault codes. Different approaches to displaying the fault codes can be taken. For instance, the self-diagnostic program can automatically iterate through the code sequences for all of the known faults. In another approach, the diagnostic technician must manually increment through the fault code sequences.

In a typical vehicle installation, the self-diagnosis feature of the vehicle microcomputer is initiated by a pair of hardware switches mounted inside the vehicle cab. One switch can be energized to cause the microcomputer to enter the self-diagnostic mode. The second switch can be used to increment through the fault code sequence.

One detriment associated with this approach is that additional hardware is required, namely the pair of diagnostic switches. The additional hardware adds cost and increases the risk of reliability problems. There is a need for a system and method for controlling diagnostic annunciators that does not require additional hardware.

SUMMARY OF THE INVENTION

In view of this need, the present invention contemplates a system and method for controlling diagnostic annunciators that utilizes the existing vehicle throttle. In one aspect of the invention, the throttle position is sensed to initiate the self-diagnostic, or lamp flash-out, mode, and to increment through the fault code sequence. Preferably, the system is implemented by software stored within the engine control module (ECM) or other on-board microprocessor or microcontroller.

In one embodiment, the system includes several software modules, including a diagnostic activation switch, an increment switch and a throttle cycle indicator. The throttle cycle indicator receives signals from a throttle position sensor concerning the position of the vehicle throttle between its lower and upper limits of movement. In the preferred embodiment, the throttle cycle indicator determines whether the throttle has been cycled between its limit positions, and, if so, generates a cycle signal that is used by either the diagnostic activation switch or the increment switch module.

In one feature of the invention, the diagnostic activation switch activates the throttle-based diagnostic mode upon receipt of a predetermined number of cycle signals. In one specific embodiment, the vehicle throttle must be depressed and released three times before the activation switch is enabled. In a further feature, a timer runs during each cycle of the throttle. If the requisite number of cycles do not occur within a predetermined time period, the activation switch is not enabled. However, if the vehicle operator depresses and releases the throttle enough times within the time period, an activation signal is generated.

In accordance with the invention, the increment switch module is enabled by this activation signal. At this point, each subsequent cycle signal from the throttle cycle indicator is fed to the increment switch. When the increment switch receives a cycle signal, it generates an increment signal signifying that the annunciators are to be incremented. This increment signal can be provided to a fault code generator maintained by the ECM that is programmed to activate the various annunciators according to a fault code protocol. The fault code generator is therefore responsive to the increment signal to sequence through the fault codes as if a manual switch were being manipulated.

While the present invention is intended to eliminate the need for the manual activation and increment switches of the prior art, one feature of the invention contemplates retrofitting the inventive system and method to accommodate existing manual switches. With this feature, the state of the manual switches is polled with each loop of the software routine. The self-diagnostic mode can be enabled by the manual switch or by the throttle. In addition, the fault code sequence can be instituted by the manual increment switch or by repeated cycles of the throttle.

In the preferred embodiment, the self-diagnosis mode requires satisfaction of certain initial conditions. For example, the inventive routine first evaluates whether a diagnostic switch is set to permit throttle-based diagnostics. A state sensor then determines whether the engine is stopped and whether the vehicle keyswitch is on. When these conditions are met, the ECM can automatically enter the self-diagnostic mode using the throttle for input.

It is contemplated that the software routines according to the present invention will loop continuously until one of the initial conditions fails. In other words, until the engine is started or the keyswitch turned off, the inventive protocol will be executed. If the throttle is not cycled the diagnostic activation switch will not be enabled or the increment switch will not generate a signal to increment through the fault code sequence. However, as long as the initial conditions are constantly satisfied, the system of the present invention will continuously poll the vehicle throttle to determine whether some self-diagnostic activity should be initiated.

It is one object of the present invention to provide a means for initiating self-diagnosis of fault annunciators using the vehicle throttle. It is a further object to eliminate the need for extra manually manipulated hardware switches to accomplish the fault code flash-out sequence of an on-board microcomputer.

One benefit of the present invention is that is relies upon existing hardware, namely the vehicle throttle, for operator input. A further advantage is that the inventive system can be substantially software-based, which facilitates modification and reprogramming. Other benefits, advantages and object of the present invention can be gleaned from the following written description and accompanying figures.

DESCRIPTION OF THE PREFERRED EMBODIMENTS

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 1A:
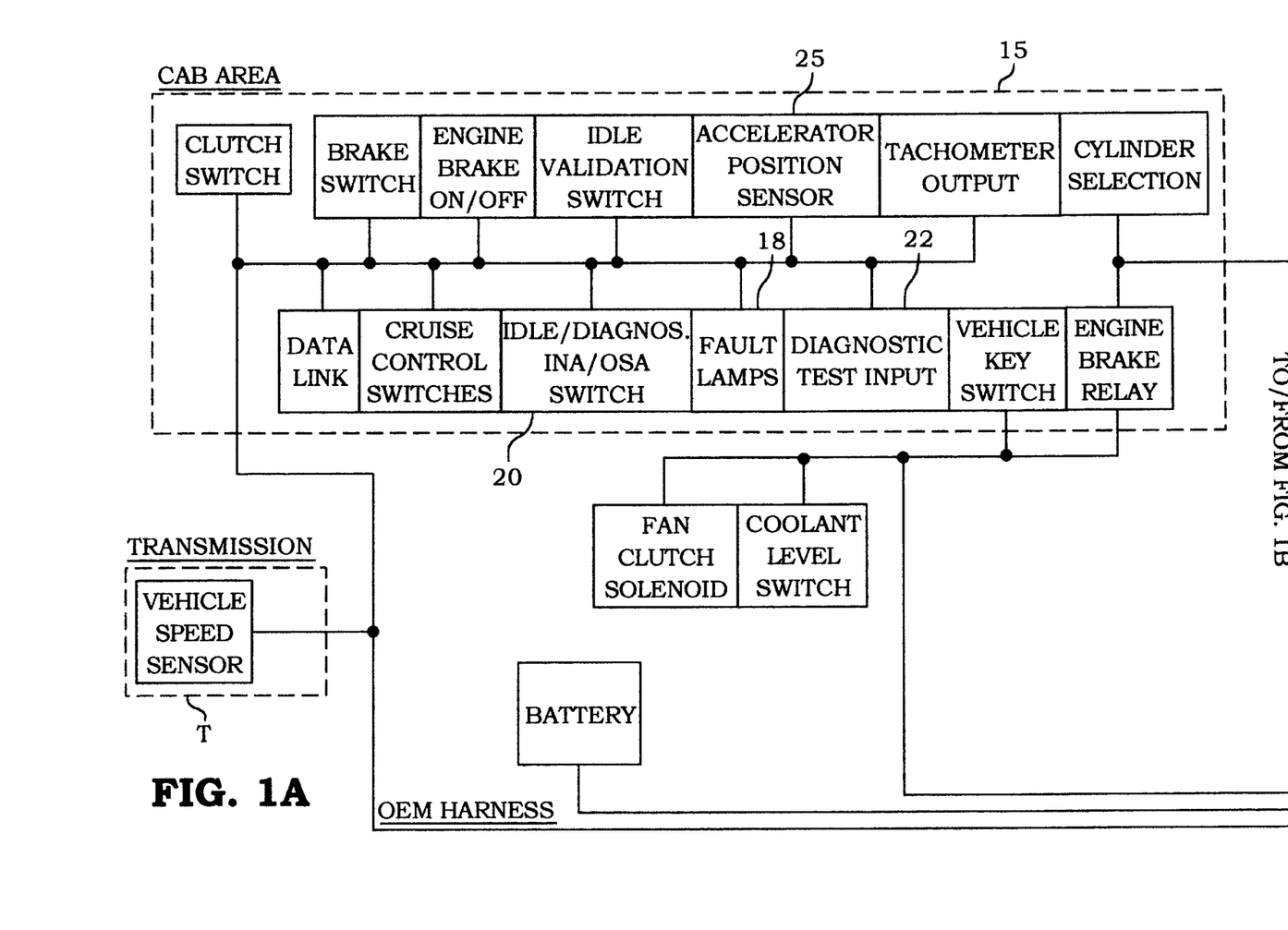
FIG. 1 is a schematic representation of a vehicle and engine control and monitoring system.
Figure 1B:
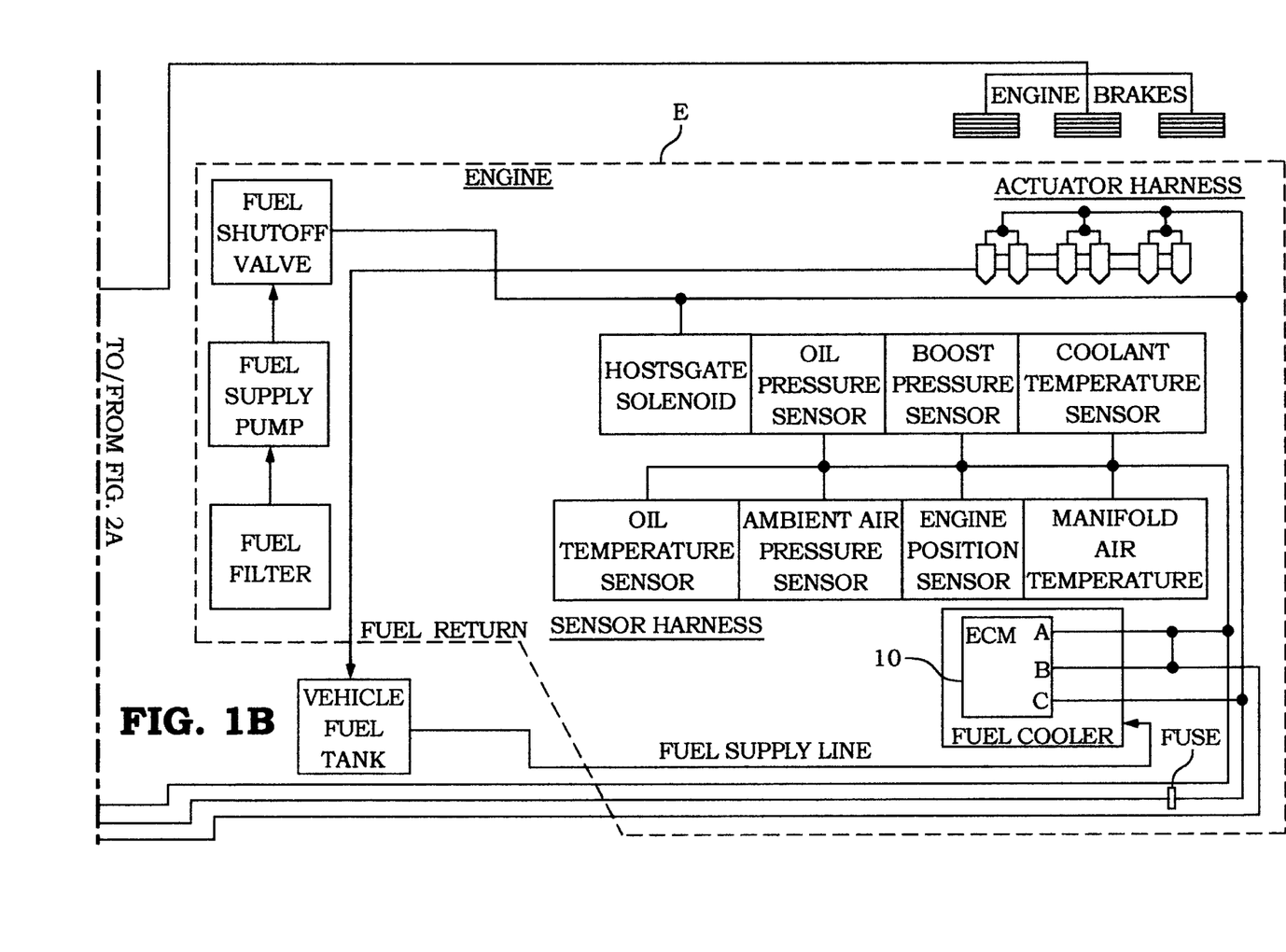

A typical electronically controlled vehicle and engine arrangement is depicted in FIG. 1. In this application, the engine E is controlled by an engine control module 10. The engine control module (ECM) provides signals to various actuators to control the operation of the engine E. In addition, the ECM 10 receives signals from various condition sensors that monitor the engine and vehicle performance.

The vehicle includes a cab section 15 that includes a variety of switches, indicators and annunciators, with most of the components mounted on a control panel. Typically, the annunciators are in the form of lamps that are illuminated in response to signals from the ECM 10. Particularly, the cab control panel can include a number of fault lamps 18. A diagnostic switch 20 can be energized to place the ECM 10 in a variety of modes, including a self-diagnosis mode. In this particular arrangement, an array of diagnostic test input switches 22 can be manually engaged to enter the self-diagnosis program. The vehicle cab also includes an accelerator/throttle position sensor 25 that relates the position of the vehicle throttle ranging from a lower to an upper limit.

Figure 2:
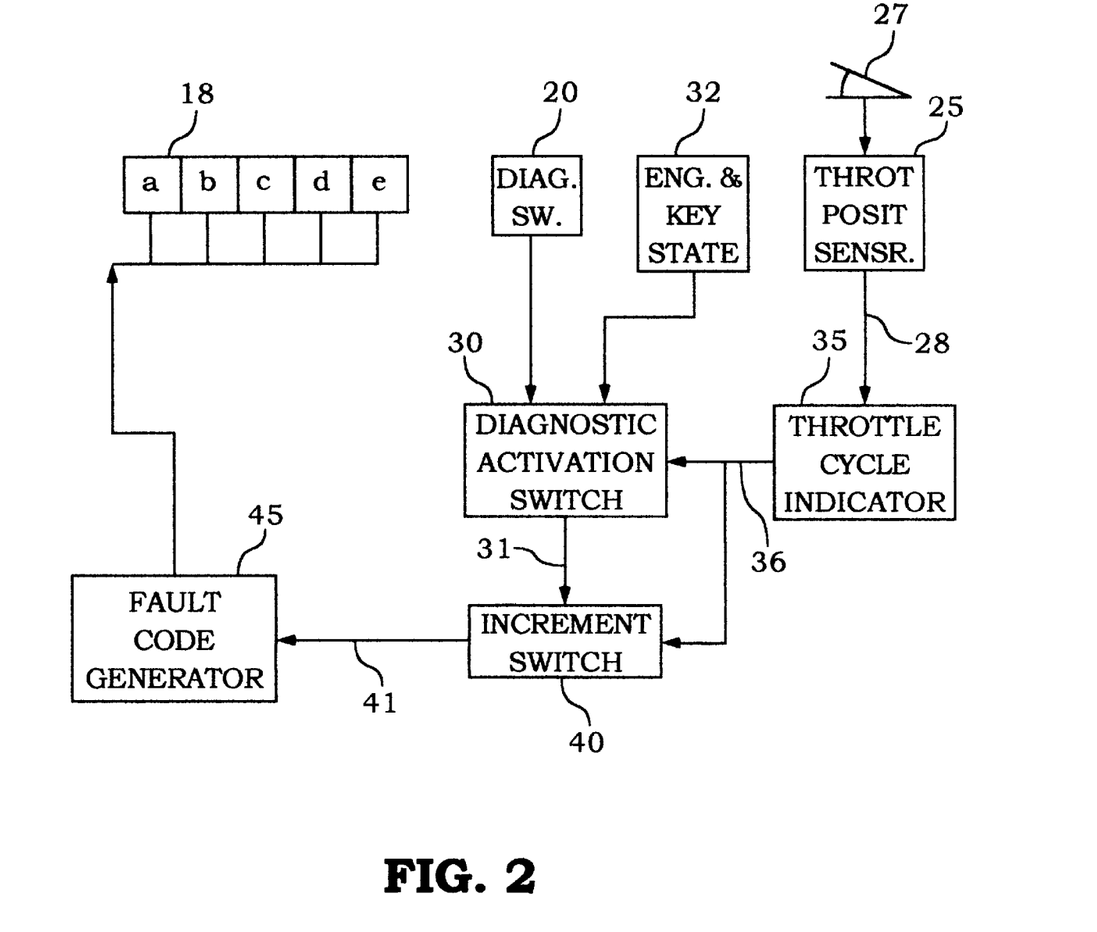
FIG. 2 is a block diagram of the components of the system for self-diagnosis of a vehicle and engine according to one embodiment of the present invention.

Referring now to FIG. 2, a block diagram of one embodiment of the system according to the present invention is depicted. The present invention operates to receive signals from the throttle position sensor 25 based upon movement of the throttle control 27. In a typical vehicle installation, the throttle control 27 is a typical accelerator pedal that is depressed and released by the vehicle operator. However, other forms of throttles are contemplated, such as hand throttles that might be used in off-road equipment. In one aspect of the present invention, this movement of the vehicle throttle initiates and controls the self-diagnosis mode of the vehicle control system implemented by the ECM 10. In this embodiment, the system includes three primary components, a diagnostic activation switch 30, a throttle cycle indicator 35 and an increment switch 40. These three components operate to generate signals that control the operation of the annunciators 18, which are preferably fault lamps 18(a)–18(e). Of course, different types or different numbers of annunciators can be implemented in accordance with the present invention.

The diagnostic activation switch 30 of the preferred embodiment is the component that activates the self-diagnosis function for operation with the vehicle throttle 27. In one specific embodiment, the diagnostic switch 20 can be placed in a position that permits vehicle throttle activation of the self-diagnosis feature. Alternatively, the diagnostic switch 20 can be put in a mode that requires manipulation of other manual switches, such as switches 22, in accordance with known prior art installations. However, in the illustrated embodiment, if the diagnostic switch 20 is put in a throttle diagnosis position, a signal is provided to enable the diagnostic activation switch 30.

As a further feature of the illustrated embodiment, an engine and key switch state sensor 32 is provided. This sensor determines whether the engine is in a "STOP" mode, or whether the engine is operating. Similarly, the sensor 32 determines whether the vehicle key switch is in the "ON" mode, rather than "OFF". In accordance with the preferred embodiment, the self-diagnosis mode for the ECM 10 cannot be activated while the engine is running or while the key switch is in the "OFF" position. Therefore, the state sensor 32 verifies these initial conditions and provides a signal to the diagnostic activation switch 30 that enables the system of the present invention.

The second primary component of the system according to the present invention is the throttle cycle indicator 35. The indicator 35 is electrically connected to the throttle position sensor 25. The throttle position sensor 25 receives signals from the throttle 27 and produces a variable throttle signal 28 in response to the position of the throttle 27. In one specific embodiment, the throttle condition sensor 25 provides a throttle signal 28 that is varied in response to the percent throttle position. For example, when the throttle is not depressed, or is fully released, the throttle is said to be at the 0% position. At the other end of the spectrum, when the throttle 27 is fully depressed, it can be said that it is at the 100% throttle position. Thus, the throttle position sensor 25 generates a variable throttle signal 28 that ranges between the 0 and the 100% position.

The throttle cycle indicator 35 receives this variable throttle signal 28 and determines whether there has been a complete cycle of the throttle 27. In accordance with the preferred embodiment, the throttle 27 is deemed to have been cycled when it is depressed from an upper limit to a certain lower limit and then released to return to the predetermined upper limit. In other words, the throttle cycle indicator 35 produces a cycle signal 36 each time the throttle 27 is depressed and released.

This cycle signal 36 is provided to the diagnostic activation switch 30 and to the increment switch 40. In accordance with a preferred embodiment of the invention, the diagnostic activation switch 30 is energized only after receipt of a certain number of cycle signals 33 from the throttle cycle indicator 35. In one specific embodiment, three such cycle signals are required, corresponding to the vehicle operator or technician depressing the throttle 27 three times. Thus, before the diagnostic activation switch 30 will generate an activation signal 31, three conditions must be satisfied in the preferred embodiment: 1) the diagnostic switch 20 is turned to the throttle activation mode; 2) the engine and key switch are in the proper states; and 3) the throttle 27 is depressed and released (or cycled) a predetermined number of times.

When these conditions are met, the diagnostic activation switch 30 generates an activation signal 31 that is provided to the increment switch 40. Without this activation signal 31, the increment switch 40 is not enabled. Once activated, however, the increment switch 40 will generate an increment signal 41 upon receipt of each cycle signal 36 from the throttle cycle indicator 35. This increment signal 41 is then provided to a fault code generator 45 that can reside within the ECM 10. The fault code generator 45 can be of known configuration and operable to control the sequence of energizing the annunciators 18(a)–18(e). In other words, the fault code generator 45 is part of the self-diagnostic program implemented by the ECM and determines the manner and sequence of flashing or illuminating the annunciator lamps 18. The increment signal 41 allows the operator or diagnostic technician to scroll or increment through the fault codes by simply depressing the throttle 27. Depending upon the nature of the fault code generator 45, depressing the throttle 27 can advance which one of the fault lamps 18(a)–18(e) is illuminated, or can increment through the fault code sequences in which all of the annunciator lamps 18 are illuminated according to predetermined fault code indicia.

In one aspect of the present invention, the primary elements of the diagnostic system, namely the activation switch 30, the cycle indicator 35 and the increment switch 40 are software-based components. Preferably, these components are incorporated into the engine control and diagnostic routines maintained and activated by the ECM 10. It is understood that while the illustrated embodiment shows separate modules for each of these functions, software implementing the teachings of the present invention can utilize greater or fewer software modules. In addition, the illustrated embodiment relies upon signals from the diagnostic switch 20 and the engine and key state sensor 32, which signals can be eliminated in alternative applications of the present invention. The primary components of the invention relate the vehicle throttle 27 to the ECM diagnostic mode so that the diagnostic mode can be entered and controlled simply by operation of the vehicle throttle.

In accordance with one embodiment of the present invention, the ECM 10 includes software routines or modules to perform a sequence of steps depicted in the flow charts of FIGS. 3–7. Following the start 50 of the routine, it is determined in the conditional step 51 whether the diagnostic switch 20 is in the throttle diagnostic mode. If so, then the next two conditional steps 52 and 53 are performed by the engine and key switch state sensor 32 to determine whether the engine is in the "STOP" state and whether the key switch is in the "ON" state. If either of these conditions is not met, the program flow continues to steps 55 and 56. In these steps, a "throttle_test_switch" is set to "OFF" and a diagnostic "flag" is set to "false". These two software variables are preferably maintained in a memory of the ECM 10 for later use in the program flow to determine whether the vehicle throttle 27 is to be used to control the diagnostic mode of the ECM.

Figure 3:
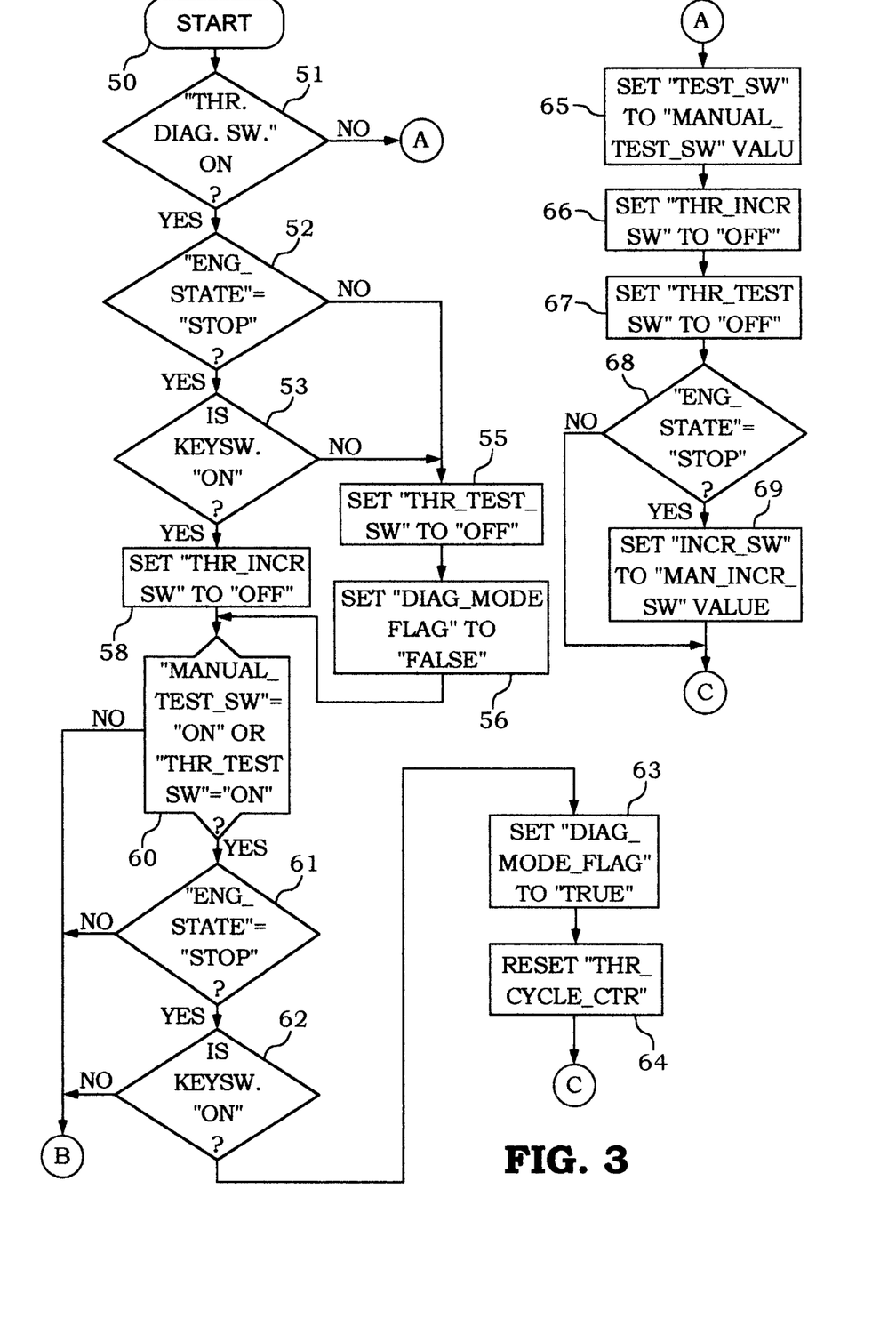
FIG. 3 is a flow chart of an initial sequence of steps implemented by the system illustrated in the block diagram of FIG. 2 according to a preferred embodiment of the invention.

If the initial conditions are met, namely that the engine and key switch states are proper, then the program flows to step 58. In this step, a variable "throttle_increment_switch" is set initially to "OFF". This "throttle_increment_switch" is used by the increment switch module 40 shown in FIG. 2. When this variable is set to "OFF", the increment switch module 40 will not transmit an increment signal 41. Alternatively, of course, when the "throttle_increment_switch" variable is "ON", the increment switch module 40 operates in the manner discussed above.

At this point, a further set of condition tests is conducted. First, it is determined whether the diagnostic switch 20 is set to a manual test or a throttle test position in step 60. In one feature of the illustrated embodiment, the same program steps can be followed when the diagnostic sequence is controlled by the manual switches 22. This feature permits the inventive system to be retrofitted to an existing vehicle having the traditional array of manual switches.

In the next two conditional steps 61 and 62, the engine and key switch states are again evaluated. If all of the conditionals 60–62 are met, the software routine is intended to operate in the self-diagnosis mode. Consequently, in step 63 the variable "diagnostic_mode_flag" is set to "TRUE". In the following step 64, a variable "throttle_cycle_counter" is reset to zero. This variable will be used in subsequent portions of the program flow.

Referring back to the beginning of the flow chart in FIG. 3, at the conditional step 51 it is determined whether the diagnostic switch 20 is in the throttle diagnosis mode. In this specific embodiment, it is contemplated that the diagnostic switch 20 can be placed in one of several positions. One position is indicative that the diagnostic function is to be conducted using the vehicle throttle 27. Another position is indicative that the diagnostic mode is to be controlled by the set of manual switches 22. Thus, if the conditional of step 51 fails, the program passes to a subroutine at point A. In this subroutine, a variable "test_switch" is set to "MANUAL" in step 65, while the variables "throttle_increment_switch" and "throttle_test_switch" are set to "OFF". With these latter two variables set to the "OFF" state, any subsequent operation in the self-diagnosis mode will be governed by manual switches contained within the vehicle cab 15. Further, within this subroutine it is determined whether the engine is stopped or running in the conditional step 68. If the engine is in the "STOP" state, another generic variable "increment switch" is set to "MANUAL" in step 69. If the conditional in step 68 is not met, then the variable "increment_switch" remains at a null value so that the self-diagnosis mode is bypassed.

If the self-diagnosis mode is set to rely upon throttle input, but one or more of the conditions in steps 60–62 are not met, then the program passes to a second subroutine at point B. In this subroutine, illustrated in the flow chart of FIG. 4, the first step 70 is to determine whether a throttle error handling procedure is enabled. If not, then the variable "throttle_test_switch" is set to "OFF" in step 72 and the variable "diagnostic_mode.flag" is set to "FALSE" in step 73. With these two flags set, the self-diagnosis mode will not rely upon throttle input.

Figure 4:
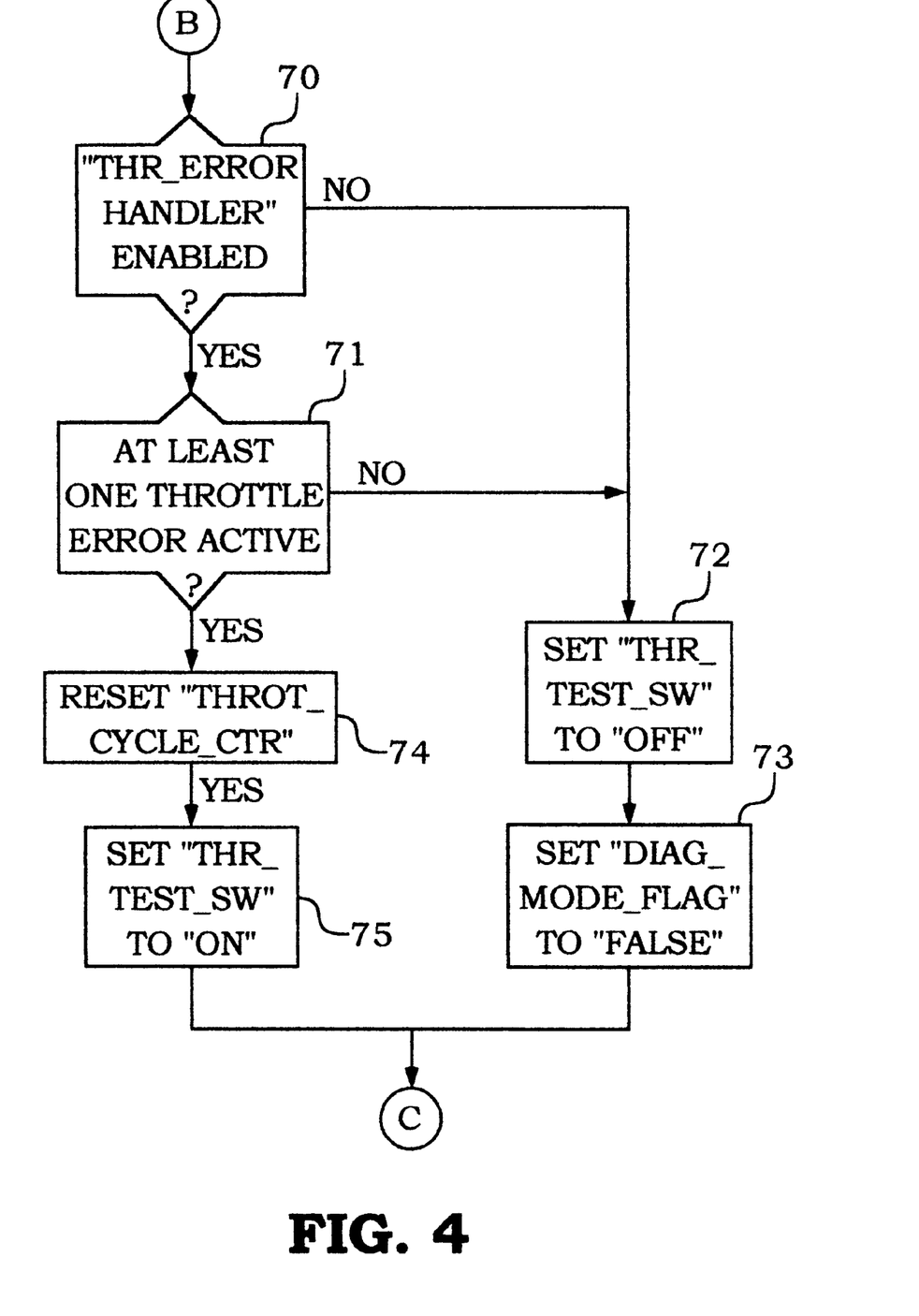
FIG. 4 is a flow chart of a subroutine following the steps shown in the flowchart of FIG. 3.

If the throttle error handler is enabled, then it is determined in conditional step 71 whether at least one throttle error is active. The nature of the throttle errors registered in step 71 will depend upon the throttle position sensor 25 and the ECM 10 of the particular vehicle. If this condition is not met, then the program flows to step 72 and 73 discussed above. At this point, it is presumed that an unresolved throttle error has occurred and that the use of the throttle to sequence through the fault codes is inappropriate. On the other hand, if the throttle handler is activated and at least one throttle error is active, then the variable "throttle_cycle_counter" is reset in step 74 and the variable "throttle_test_switch" is set to the "ON" state in step 75. In this instance, the throttle error handler is addressing and correcting any throttle errors so the self-test diagnostic mode can proceed using input from the input throttle 27.

Figure 5:
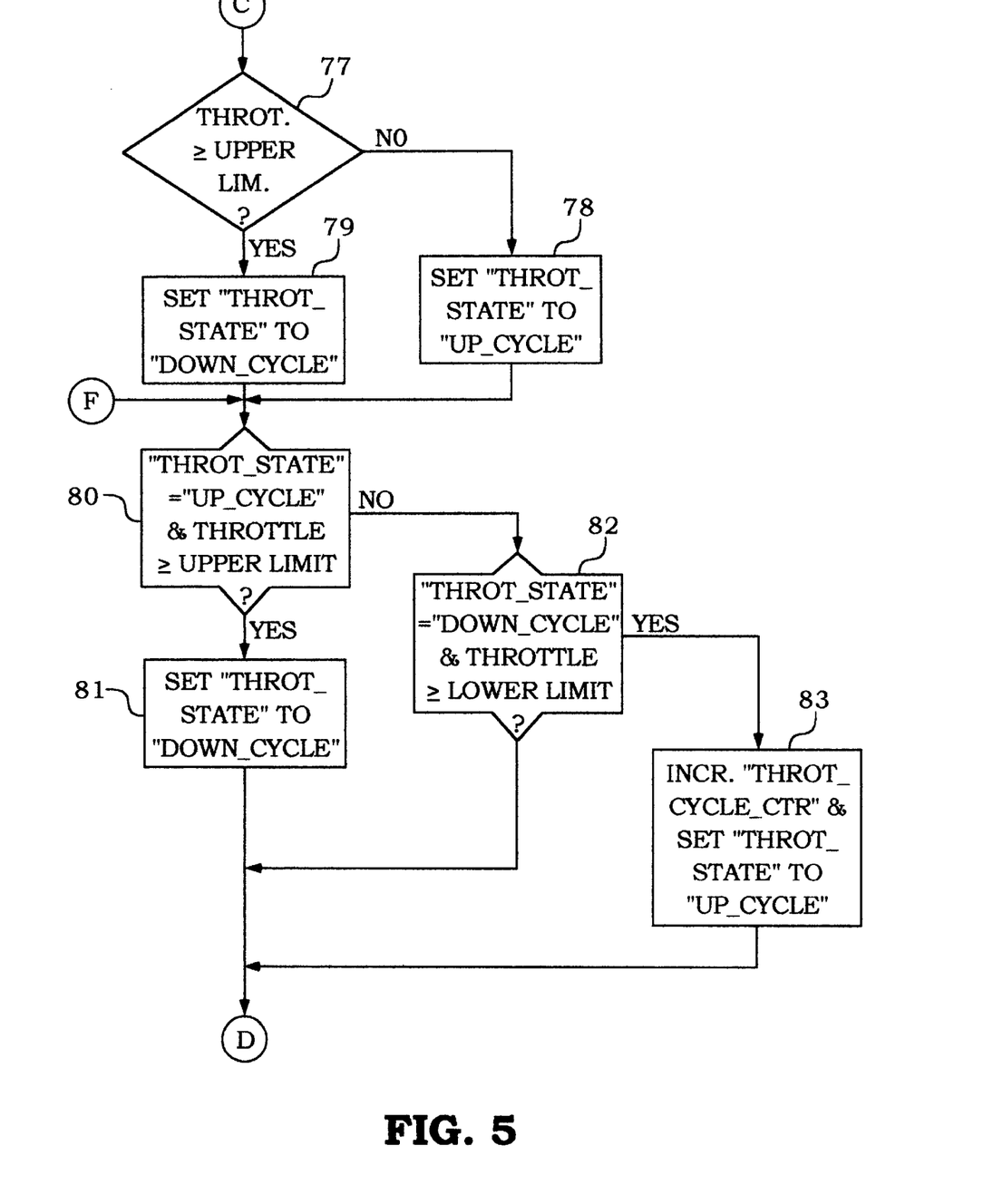
FIG. 5 is a flow chart of steps subsequent to the steps shown in the flowchart of FIG. 3.

The main portion of the routine shown in FIG. 3, as well as the two subroutines shown in FIGS. 3 and 4, merge at point C to follow the remainder of the software protocol. Referring now to FIG. 5, software implemented by the throttle cycle indicator 35 is depicted. It is the function of this module 35 to determine whether the vehicle throttle 27 has been cycled, or has been depressed and released as described above. In accordance with the preferred embodiment, the throttle 27 is determined to have a lower limit and an upper limit position, as previously discussed. At the extremes, the lower limit corresponds to a 100% throttle position, while the upper limit corresponds to a 0% throttle position. However, the present invention contemplates a lower limit value that is less than the full throttle (100%) position and an upper limit value in which the throttle is slightly depressed. The focus of the throttle cycle indicator 35 is to verify that the operator has substantially fully depressed and substantially fully released the throttle 27. Thus, it is not necessary that the throttle be moved between its two extremes, but only that the vehicle operator has made some positive down and up movement of the throttle.

The steps 77–79 occur the first time that the self-diagnosis routine of the present invention is initiated. These steps identify the initial position of the vehicle throttle when the inventive routine is activated. In the conditional step 77, it is determined whether the throttle 27 is past the upper limit value. If so, then a variable "throttle_state" is set to a value "down_cycle" in step 79. This value means that the next movement of the throttle 27 will be down or depressed. Alternatively, if the conditional in step 77 is not met, namely that the throttle is not past the upper limit value, then the variable "throttle_state" is set to the value "up_cycle" meaning that the throttle will next be moving up or being released.

Once the throttle state has been initialized, it is determined whether the throttle has actually cycled between its limits, as defined above. The steps 80–83 are executed at least twice for each cycle. According to the present embodiment, a cycle requires the variable "throttle_state" to change from the "up_cycle" value to the "down_cycle" value. Thus, in the first conditional step 80 it is determined whether the current value for the variable "throttle_state" is "up cycle" and whether the throttle is past the upper limit. If this conditional step 80 is met, then the value for the variable "throttle_state" is changed to "down cycle". In this leg of the throttle cycle indicator module 35, the throttle has not cycled so no separate cycle signal 36 is sent by the indicator.

If the first conditionals of step 80 are not met, then a second conditional 82 is evaluated to determine whether the value of "throttle_state" is equal to "down cycle" and whether the throttle is below the lower limit value (i.e., depressed). If this conditional is not met, then the program follows from step 82 to merge with the output from step 81. However, if the conditional step 80 is failed and the conditions of step 82 are met, then it is determined that a throttle cycle has occurred. In this case, the throttle cycle indicator 35 generates a cycle signal 36. More appropriately, in accordance with the illustrated flow chart, in step 83, the variable "throttle_cycle_counter" is incremented to indicate that an additional throttle cycle has occurred. Furthermore, in this step 83, the value of the variable "throttle_state" is changed to "up_cycle" for evaluation of the next throttle cycle.

It is understood that the steps corresponding to the throttle cycle indicator 35 will be repeated continuously until the self-diagnosis mode is exited. Thus, the value of the variable "throttle_state" will be constantly changed between "up_cycle" and "down_cycle" as long as the throttle 27 is repeatedly moved. Of course, depending upon the length of time the routine takes to operate, the throttle may not have changed position with each loop of the routine so there would be no change in value for the variable "throttle_state" and consequently no change in the value of the variable "throttle_cycle_counter".

Figure 6:
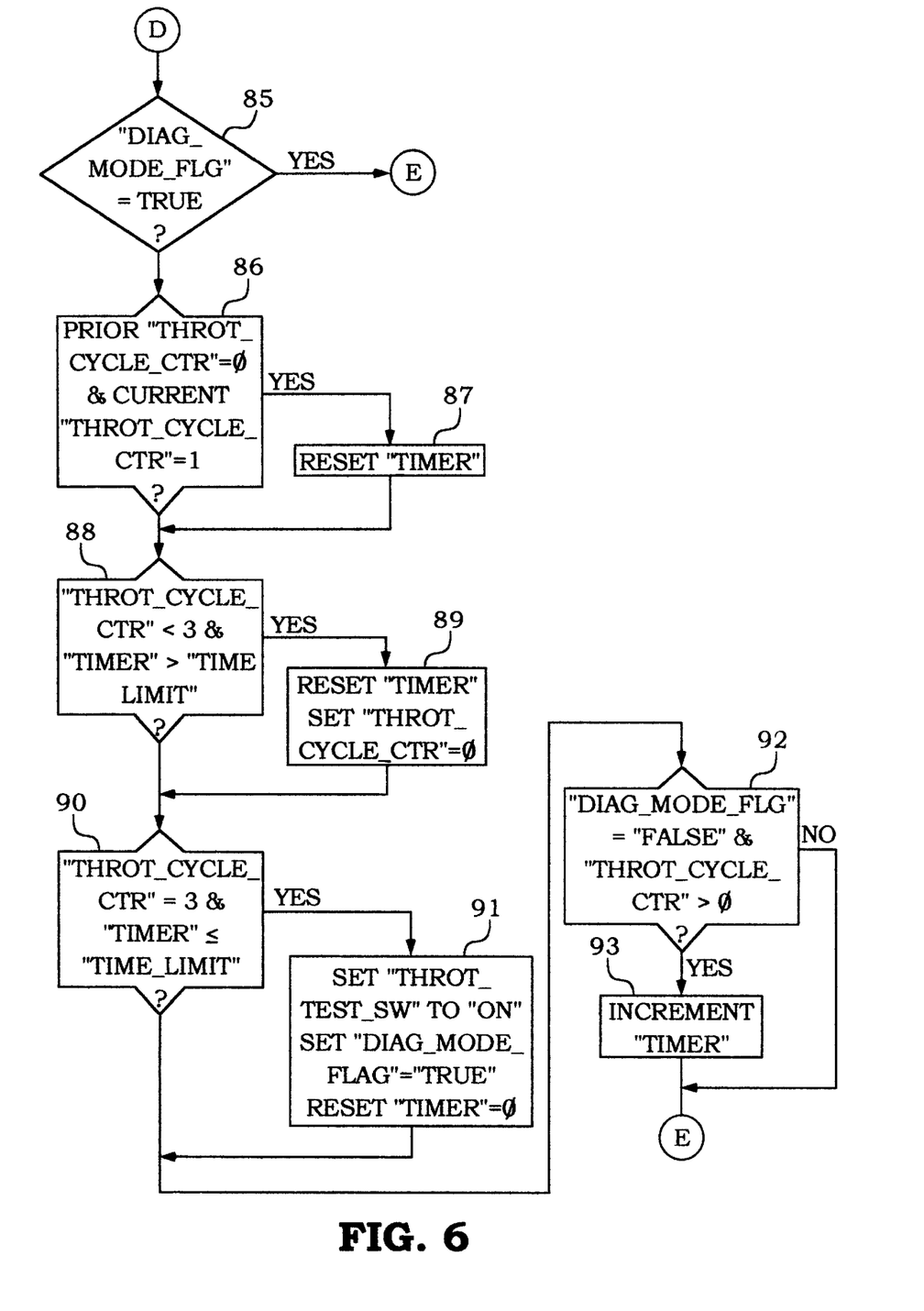
FIG. 6 is a flow chart of steps subsequent to the steps shown in the flowchart of FIG. 5 that are implemented by the diagnostic activation switch shown in FIG. 2.

Referring now to FIG. 6, steps executed by the diagnostic activation switch module 30 are illustrated. The output from the throttle cycle indicator 35 shown in the flow chart of FIG. 5 continues at point D in FIG. 6. In the next step, a conditional 85, it is determined whether the variable "diagnostic_mode_flag" has been set to "TRUE". If this flag has already been set, then the activation signal 31 has already been generated, meaning that the self-diagnosis mode is to proceed using the vehicle throttle. Program flow then passes to point E. On the other hand, if the "diagnostic mode flag" is not "TRUE", then a determination must be made as to whether the operator or technician intends to enter the throttle activated self-diagnosis mode.

As explained previously, in accordance with the specific embodiment, this mode is entered by a predetermined number of cycles of the vehicle throttle 27. In one specific embodiment, three such cycles are required, meaning that the operator must depress and release the throttle 27 three successive times. In a further aspect of the invention, a timer is started once the throttle is initially depressed. This timer continues to run as the throttle is successively depressed. Once the timer exceeds a predetermined time limit, it is ascertained that the vehicle operator did not intend to enter the self-diagnosis mode. On the other hand, if the requisite number of throttle cycles occur within the predetermined time limit, then the diagnostic activation switch 30 generates its activation signal 31.

In the specific embodiment shown in FIG. 6, the next conditional step determines whether the throttle cycles are being counted for the first time. Thus, in conditional step 86, it is evaluated whether the prior "throttle_cycle_counter" was zero while the current value of the variable "throttle_cycle_counter" is 1. If so, then the throttle 27 has already been depressed and released, which requires activation and resetting of the timer in step 87.

If the throttle 27 has been previously depressed, then the prior value of the "throttle_cycle counter" will not equal zero. In that event, another conditional step 88 follows in which is determined whether the throttle has been cycled less than the requisite number of times while the time limit has expired. If both conditions are met, then the timer is reset in step 89 and the value of the "throttle cycle_counter" is reset to zero. In this event, no self-diagnosis will occur using throttle input, at least at this point. It is understood, however, that the software steps of FIGS. 3–7 can be continuously executed. Thus, the operator can enter the throttle diagnosis mode at a later time by the proper sequence of throttle movements.

In a following step, a conditional 90 is evaluated to determine whether the throttle has been cycled the predetermined number of times within the predetermined time limit. If so, then control passes to step 91 in which the variable "throttle_test_switch" is set to "ON" and the variable "diagnostic_mode_flag" is set to "TRUE", the variable "throttle_cycle_timer" is reset to zero for use in subsequent cycles. Thus, step 91 is executed after all of the appropriate conditions have been met for activation of the self-diagnosis mode. In the following conditional 92, since the "diagnostic_mode_flag" has been previously set to "TRUE", the step 93 in which the timer is incremented is bypassed. On the other hand, if the time limit has not expired and the number of throttle cycles has not reached the predetermined value, then the variable "diagnostic_mode_flag" will retain its "FALSE" value. In the conditional step 92 the first part of the condition will be met, and the second part of the condition, namely that the "throttle_cycle_counter" is greater than zero, will also be met. In this case, the timer is incremented in step 93 as an indication that the routine is still waiting for the vehicle operator to depress the throttle the requisite number of times.

In this aspect of the preferred embodiment, the diagnostic activation switch 30, it is contemplated that the vehicle operator or diagnostic technician will desire to enter the throttle based self-diagnosis mode. In this instance, it is likely that the operator will depress and release the throttle in fairly rapid succession. Thus, the time limit value can be relatively short, such as 15 seconds for three cycles of the throttle. Of course, the length of the time limit is related to the number of times that the throttle must be depressed and released in order to give the vehicle operator time to perform the required steps. A greater cycle requirement may necessitate a longer time limit value. Since the time limit value is software-based, it can be retained in memory of the ECM. Thus, the time limit value, as well as the predetermined number of required throttle cycles, can be changed by changing the values in memory.

Figure 7:
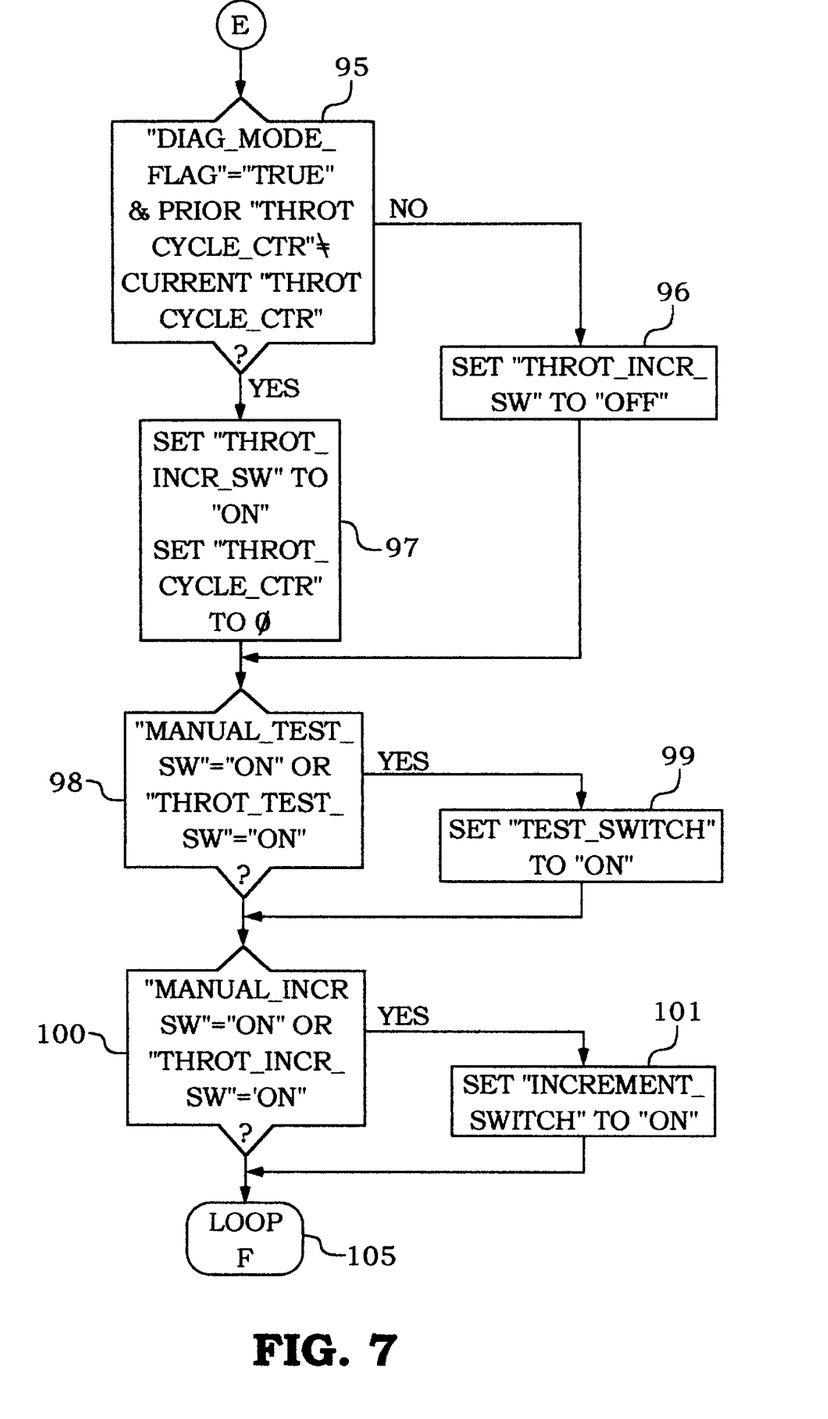
FIG. 7 is a flow chart of steps subsequent to the steps shown in the flowchart of FIG. 6 implemented by the increment switch shown in FIG. 2.

Program flow from the diagnostic activation switch 30, as shown in the flow chart of FIG. 6 proceeds to the point E, which is picked up again in the final program section shown in FIG. 7. This section of the flow chart generally corresponds to the increment switch module 40, which produces the increment signal 41 to be used by the fault code generator 45. In this portion of the protocol, the first step 95 is to determine whether the vehicle throttle 27 is being depressed and released to increment the fault codes displayed by the annunciators 18. Thus, if the "diagnostic_mode_flag" has been set to "TRUE" and the "throttle_cycle_counter" has been incremented since the last pass through the routine, then program flow will pass to step 97. On the other hand, if either test in the conditional step 95 fails, the "throttle_increment_switch" is set to the "OFF" value meaning that the throttle will not be used to increment the fault codes, and step 97 is bypassed.

Since the present routine is iterative, it is likely that the sequence of steps may pass several times before the operator physically moves the vehicle throttle. The conditional step 95 prevents unnecessary incrementing of the annunciators until the throttle has actually cycled. In step 97, the "throttle_increment_switch" is set to the "ON" state and the "throttle_cycle counter" is zeroed.

The increment switch routine of FIG. 7 continues at step 98. In this conditional step, it is determined whether either of the throttle test switch or the "manual_test_switch" is set to its "ON" state. If this conditional is met, a value for the variable "test_switch" is also set to "ON", which means that the self-diagnosis mode continues. After this conditional step 98 and step 99, an additional conditional step 100 determines whether either of the variables "manual_increment_switch" or "throttle_increment_switch" are set to "ON". If so, control passes to step 101 in which the increment signal 41 is generated and passed to the fault code generator 45. If neither the manual nor the "throttle_increment_switch" is on, then no increment signal is produced.

In either case, the routine can continue at return step 105 back to point F shown in FIG. 5. At this point, control is passed to the throttle cycle indicator 35 to determine whether the throttle has been actually depressed and released, constituting one throttle cycle. It is understood with this loop F that the throttle cycle indicator, and more particularly the "throttle_cycle_counter" variable, will be incremented. The way in which the incremented counter is used depends upon whether the diagnostic activation switch 30, or more particularly the "diagnostic_mode_flag", has been turned on or set to its "TRUE" value. If the diagnostic activation switch 30 has not been activated then each subsequent throttle cycle will be used to determine whether the activation switch should be turned on. If the throttle diagnostic mode has already been initiated by generation of the activation signal 31, then each subsequent throttle cycle signal 36 will pass through the increment switch 40 to increment the fault code generator 45.

In accordance with the flow chart shown in FIGS. 3–7, the present invention contemplates that the self-diagnostic mode can be controlled alternatively by the throttle 27 or by manual switches. Thus, in one sequence, the throttle diagnosis mode can be entered and activated by the diagnostic activation switch 30, while the fault codes can be incremented both manually and using the vehicle throttle. On the other hand, if the diagnostic switch 20 is not set to permit throttle-based diagnostic control, then no amount of manipulation of the throttle 27 will yield an increment signal 41. Instead, the increment signal must be generated by turning on the "increment_switch" (see step 100).

In a further modification, the entire software routine depicted in the flowchart of FIGS. 3–7 can be looped. In other words, control can pass at the return step 105 back to the start step 50. In this instance, steps 77–79 that determine the initial position of the throttle must be bypassed. This bypass can be accomplished by evaluating the value of the variable "throttle_state". A non-null value means that the steps of the routine have already been executed and steps 77–79 can be avoided in the current iteration.

The software routine of steps 50–105 will loop continuously as long as the initial conditions evaluated in steps 52 and 53 are satisfied. At any loop, the self-diagnosis routine can be exited if the engine is started or the key switch is turned off. In this event, the variable "diagnostic_mode_flag" is "FALSE". Step 105 can be modified into a conditional step to determine whether this variable has remained "FALSE" for a predetermined number of loops through the routine. If so, it is presumed that no self-diagnosis is desired and the routine can exit to other routines implemented by the ECM.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed:

1. A diagnostic system for an engine in a vehicle having a throttle movable to percent throttle positions between a lower limit and an upper limit, said system comprising:

a plurality of annunciators energizable to indicate engine fault conditions;

a throttle position indicator generating a variable throttle signal in response to the percent throttle position; and a diagnostic activation switch electrically connected between said throttle position indicator and said plurality of annunciators, said activation switch operable to generate an activation signal in response to a change in said throttle signal, wherein said plurality of annunciators are energizable when said activation signal is generated.

2. The diagnostic system according to claim 1, further comprising:

an increment switch connected between said throttle position indicator and said plurality of annunciators, and operable in response to said activation signal to generate successive increment signals in response to successive changes in said throttle signal, wherein said successive increment signals are operable to sequentially energize selective ones of said plurality of annunciators.

3. The diagnostic system according to claim 2, wherein:

said throttle signal has a first value corresponding to a first percent throttle position and a different second value corresponding to a relatively higher second percent throttle position, said system further comprising a throttle cycle indicator connected to said throttle position indicator and including means for generating a cycle signal in response to said throttle signal changing sequentially between said first value and said second value, and further wherein said increment switch generates an increment signal on receipt of a cycle signal from said throttle cycle indicator.

4. The diagnostic system according to claim 3, wherein said first percent throttle position is the zero throttle position.

5. The diagnostic system according to claim 3, wherein said second throttle position is the full throttle position.

6. The diagnostic system according to claim 1, further comprising a manual switch in the vehicle operable to enable and disable said diagnostic activation switch.

7. The diagnostic system according to claim 1, further comprising:

a throttle cycle indicator connected to said throttle position indicator and including means for generating a cycle signal in response to a change in said throttle signal; and wherein said diagnostic activation switch is activated by said cycle signal.

8. The diagnostic system according to claim 7, wherein:

said throttle signal has a first value when the throttle is at the lower limit and a second value when the throttle is at the upper limit; and said throttle cycle indicator is operable to generate said cycle signal only after said throttle signal has changed between said first value and said second value.

9. The diagnostic system according to claim 8, wherein said diagnostic activation switch is activated by receipt of a predetermined number of said cycle signals.

10. The diagnostic system according to claim 9, wherein said predetermined number is greater than one.

11. The diagnostic system according to claim 7, wherein said throttle cycle indicator is operable to generate said cycle signal only after said throttle signal has changed in immediate succession from said first value to said second value to said first value.

12. The diagnostic system according to claim 11, wherein said diagnostic activation switch receives said cycle signals from said throttle cycle indicator and is activated only by receipt of a predetermined number of said cycle signals.

13. The diagnostic system according to claim 12, wherein said predetermined number is greater than one.

14. The diagnostic system according to claim 12, wherein said diagnostic activation switch includes a timer for determining the elapsed time for receipt of said predetermined number of cycle signals.

15. The diagnostic system according to claim 14, wherein said diagnostic activation switch is activated only when said elapsed time is less than a predetermined period of time.

16. The diagnostic system according to claim 1, wherein said diagnostic activation switch includes:

means for determining the "ON/OFF" state of the vehicle key switch; and means for determining the "STOP" state of the vehicle engine, whereby the diagnostic activation switch is operable to generate said activation signal only when the key switch state is "ON" and the vehicle engine is in the "STOP" state.

17. A method for sequentially energizing annunciators of a vehicle engine diagnostic system comprising:

monitoring the position of the vehicle throttle between lower and upper limits;

identifying throttle cycles when the vehicle throttle is depressed and returned between the lower and upper limits;

activating a throttle diagnostic mode only after a predetermined number of throttle cycles; and thereafter sequentially energizing the annunciators for subsequent throttle cycles.

18. The method for sequentially energizing annunciators according to claim 17, wherein said activating step includes activating the throttle diagnostic mode only if the predetermined number of throttle cycles occurs within a predetermined period of time.

19. The method for sequentially energizing annunciators according to claim 17, wherein said identifying step identifies a throttle cycle only when the throttle has been depressed from the lower limit to the upper limit and returned back to the lower limit.

20. The method for sequentially energizing annunciators according to claim 17, wherein the predetermined number of cycles is greater than one.

* * * * *